(12) United States Patent
Yeh

(10) Patent No.: US 7,330,456 B2
(45) Date of Patent: Feb. 12, 2008

(54) METHOD AND APPARATUS FOR WIRELESS RELAY WITHIN A NETWORK ENVIRONMENT

(75) Inventor: Chih-Hao Yeh, Hsinchu (TW)

(73) Assignee: Mediatek, Inc., Hsin-Chu (TW)

( * ) Notice: Subject to any disclaimer, the term of this patent is extended or adjusted under 35 U.S.C. 154(b) by 948 days.

(21) Appl. No.: 10/741,405

(22) Filed: Dec. 19, 2003

(65) Prior Publication Data
US 2005/0135422 A1 Jun. 23, 2005

(51) Int. Cl.
*H04Q 7/24* (2006.01)
(52) U.S. Cl. .................. 370/338; 370/395.54; 370/474; 370/389
(58) Field of Classification Search ...................... None
See application file for complete search history.

(56) References Cited

U.S. PATENT DOCUMENTS

| | | | |
|---|---|---|---|
| 6,618,398 B1* | 9/2003 | Marchetti et al. | 370/475 |
| 6,895,443 B2* | 5/2005 | Aiken | 709/245 |
| 7,046,666 B1* | 5/2006 | Bollay et al. | 370/392 |
| 2003/0142684 A1* | 7/2003 | Miyachi | 370/401 |
| 2004/0095932 A1* | 5/2004 | Astarabadi et al. | 370/389 |
| 2004/0151193 A1* | 8/2004 | Rune et al. | 370/401 |
| 2004/0190477 A1* | 9/2004 | Olson et al. | 370/338 |
| 2004/0255033 A1* | 12/2004 | Edney et al. | 709/229 |
| 2006/0062187 A1* | 3/2006 | Rune | 370/338 |
| 2007/0025349 A1* | 2/2007 | Bajic | 370/389 |

* cited by examiner

*Primary Examiner*—Chirag G. Shah
(74) *Attorney, Agent, or Firm*—Thomas, Kayden, Horstemeyer & Risley

(57) ABSTRACT

An apparatus and method for relaying messages via a wireless medium within a network environment having an access point that provides access to a destination station. The apparatus of the invention includes a means for modifying an ARP query packet by substituting a built-in MAC address for a sender address in an ARP datagram of the ARP query packet and a source address in a MAC header of the ARP query packet and further changing a BSSID in the MAC header of the ARP query packet from the built-in MAC address to a MAC address of the access point. Moreover, the apparatus of the invention includes another means for modifying an ARP reply packet issued from the destination station by changing a BSSID in a MAC header of the ARP reply packet from the MAC address of the access point to the built-in MAC address.

20 Claims, 7 Drawing Sheets

METHOD AND APPARATUS FOR WIRELESS RELAY WITHIN A NETWORK ENVIRONMENT

BACKGROUND OF THE INVENTION

1. Field of the Invention

The invention relates to communication networks, and more particularly to a mechanism for relaying messages via a wireless medium within a network environment.

2. Description of the Related Art

A wireless local area network (wireless LAN or WLAN) is a cellular network that facilitates communication via radio signals instead of wires. Wireless LANs are used increasingly in both home and corporate environments. Innovative ways to utilize WLAN technology are helping people to work and communicate more efficiently. The advantage of high mobility and the absence of cabling and other fixed infrastructure have proven to be a boon for many users. Wireless LAN users can use the same network applications they use on an Ethernet LAN. Wireless LAN adapter cards used on laptop and desktop systems, support the same protocols as Ethernet adapter cards. For most users, there is no noticeable functional difference between a wired Ethernet desktop computer and mobile WLAN workstation other than the added benefit of the ability to roam within the WLAN.

In 1997, the first wireless Ethernet standard, known simply as 802.11, was adopted and published by the IEEE. This unified standard provided several modes of operation and data rates up to a maximum two megabits per second (Mbps). Work soon began on improving the performance of 802.11. The eventual results were two new but incompatible versions of the standard, 802.11b and 802.11a. The "b" version operated in the same frequency range as the original 802.11, the 2.4 GHz Industrial-Scientific-Medical (ISM) band, but the "a" version ventured into the 5 GHz Unlicensed National Information Infrastructure (U-NII) band. 802.11b mandated complementary code keying (CCK) for rates of 5.5 and 11 Mbps, and included as an option Packet Binary Convolutional Coding (PBCC) for throughput rates of 5.5 and 11 Mbps, and additional range performance. 802.11a turned to another multi-carrier coding scheme, orthogonal Frequency Division Multiplexing (OFDM), and achieves data rates up to 54 Mbps. In June of 2003, IEEE announced its final approval of the IEEE 802.11g standard which adopted a hybrid solution that included the same OFDM coding and provided the same physical data rates of 802.11a. Nonetheless, 802.11g occupied the 2.4 GHz band of the original 802.11 standard.

The IEEE 802.11 standard is a member of the IEEE 802 family that specifies local area network technologies. 802.11 focuses on the lower two layers of the OSI model, the data link and physical layer. The simplest 802.11 networks consist of a group of stations that communicate with each other by creating a basic service set (BSS). There are two possible configurations of the BSS, Independent (IBSS) and infrastructure (known simply as BSS). An IBSS or ad hoc network consists of two or more wireless stations that communicate directly, peer-to-peer, without the services of an Access Point (AP). The IBSS is typically created for temporary communication between a few stations. The more common and reliable configuration is called infrastructure. In this configuration, each BSS has an AP, through which all communication is relayed. This can increase the coverage area since each station only needs to be within the range of a wireless AP. BSS and IBSS are certainly useful networks, but these independent topologies only facilitate communication between wireless stations. The most useful type of 802.11 configuration is the extended service set (ESS) created by linking BSSs with a backbone network. The backbone network is referred to as the distribution system medium and is typically wired Ethernet. Most wireless APs operate as bridges to the wired Ethernet LAN. In an ESS network, each wireless station appears as a normal Ethernet station to the rest of the nodes on the wired Ethernet LAN. The AP is responsible for bridging traffic to and from the wired LAN to the wireless LAN.

The IEEE 802.11 standard further defines the wireless distribution system (WDS) to wirelessly interconnect BSSs. Using WDS it is possible to wirelessly connect APs, and in doing so extend a wired infrastructure to locations where cabling is not possible or inefficient to implement. For example, WDS is a good solution to connect an office in a building across the street or connect a location in the manufacturing area where laying cable is complicated (and expensive). Unfortunately, IEEE 802.11 does not to date, specify the details of services provided by the WDS. At present, various manufacturers implement the WDS functionality in proprietary ways so only those APs made by a single manufacturer are able to be wirelessly interconnected via WDS, leading to less interoperability.

Accordingly, there is a need for an apparatus and method that can relay messages from a station to another BSS via a wireless medium. Specifically, it would be desirable to provide an AP with a mechanism for extension of an existing wired infrastructure without the use of WDS.

SUMMARY OF THE INVENTION

In accordance with one aspect of the invention, an apparatus for relaying messages via a wireless medium within a network environment is disclosed. In the network environment, an access point is installed to provide access to a destination station. The apparatus of the invention includes a means, responsive to receipt of an Address Resolution Protocol (ARP) query packet transmitted wirelessly from an associated station, for modifying the ARP query packet by substituting a built-in hardware address for a sender hardware address in an ARP datagram of the ARP query packet and a source hardware address in a MAC header of the ARP query packet and further changing a set identifier in the MAC header of the ARP query packet from the built-in hardware address to a hardware address of the access point. In addition, the apparatus of the invention comprises another means, responsive to receipt of an ARP reply packet issued from the destination station whose network-layer address matches a target network-layer address in the ARP datagram of the ARP query packet, for modifying the ARP reply packet by changing a set identifier in a MAC header of the ARP reply packet from the hardware address of the access point to the built-in hardware address, where a target hardware address in an ARP datagram of the ARP reply packet has been set to a hardware address of the destination station.

In accordance with another aspect of the invention, a method for relaying messages via a wireless medium within a network environment is proposed. The first step of the invention is to establish association between two access points, where a first access point acts as a client from the perspective of a second access point. In response to receipt of an Address Resolution Protocol (ARP) query packet transmitted wirelessly from a first station that is associated to the first access point, the ARP query packet is modified at the first access point by changing a set identifier in the MAC header of the ARP query packet from a hardware address of the first access point to that of the second access point and further using the hardware address of the first access point in substation for a sender hardware address in an ARP datagram of the ARP query packet and a source hardware address in a MAC header of the ARP query packet. After that, an ARP reply packet is modified at the first access point in response to receipt of the ARP reply packet issued from a second station whose network-layer address matches a target network-layer address in the ARP datagram of the ARP query packet, where a target hardware address in an ARP datagram of the ARP reply packet has been set to a hardware address of the second station. The ARP reply packet is modified by changing a set identifier in a MAC header of the ARP reply packet from the hardware address of the second access point to that of the first access point.

In accordance with yet another aspect of the invention, association is first established between two access points where a first access point acts as a client from the perspective of a second access point that provides access to a second station. The second access point forwards an Address Resolution Protocol (ARP) query packet issued from the second station. The ARP query packet is intended to resolve a network-layer address for a first station which cannot communicate directly with the second station and is associated to the first access point. In response to receipt of the ARP query packet transmitted wirelessly, the ARP query packet is modified at the first access point by changing a set identifier in a MAC header of the ARP query packet from a hardware address of the second access point to that of the first access point. The modified ARP query packet is then broadcast wirelessly. After that, an ARP reply packet is modified at the first access point in response to receipt of the ARP reply packet transmitted wirelessly from the first station whose network-layer address matches a target network-layer address in the ARP datagram of the modified ARP query packet. The modification of the ARP reply packet includes the steps of (i) substituting the hardware address of the first access point for a target hardware address in an ARP datagram of the ARP reply packet and a source hardware address in a MAC header of the ARP reply packet and (ii) changing a set identifier in the MAC header of the ARP reply packet from the hardware address of the first access point to that of the second access point. The second station thereby obtains a mapping of the hardware address of the first access point to the network-layer address of the first station.

In accordance with yet another aspect of the invention, a first access point is associated with a second access point in the beginning, where the second access point provides access to a second station and the first access point acts as a client from the perspective of the second access point. Additionally, a first station which cannot communicate directly with the second station is associated to the first access point. Upon receipt of a data packet transmitted wirelessly from the first station, the first access point modifies the data packet by substituting a MAC address of the first access point for a source MAC address in a MAC header of the data packet and further changing a set identifier in the MAC header of the data packet from the MAC address of the first access point to that of the second access point. After that, an acknowledgement packet is modified at the first access point in response to receipt of the acknowledgement packet issued from the second station whose IP address matches a destination IP address in an IP datagram of the modified data packet. The modification of the acknowledgement packet includes the steps of (i) changing a set identifier in a MAC header of the acknowledgement packet from the MAC address of the second access point to that of the first access point and (ii) changing a destination MAC address in the MAC header of the acknowledgement packet from the MAC address of the first access point to that of the first station.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

With reference to the accompanying figures, exemplary embodiments of the invention will now be described. The exemplary embodiments are described primarily with reference to block diagrams and flowcharts. As to the flowcharts, each block within the flowcharts represents both a method step and an apparatus element for performing the method step. Herein, the apparatus element may be referred to as a means for, an element for, or a unit for performing the method step. Depending upon the implementation, the apparatus element, or portions thereof, may be configured in hardware, software, firmware or combinations thereof. As to the block diagrams, it should appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 1:
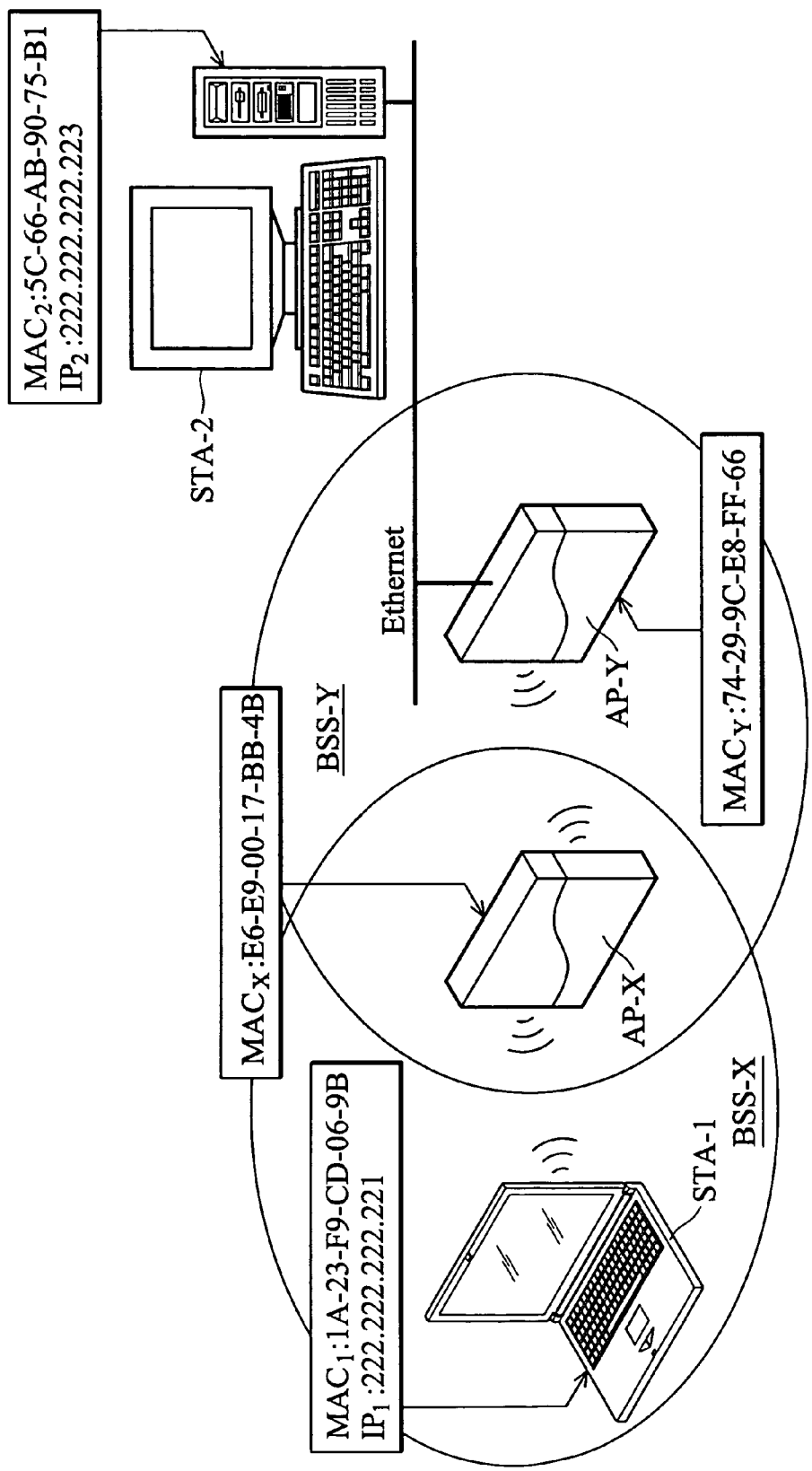
FIG. 1 is a diagram of an exemplary network environment in accordance with an embodiment of the invention.

With reference now to FIG. 1, two basic service sets BSS-X and BSS-Y are illustrated as an example. The basic service sets BSS-X and BSS-Y are driven by access points AP-X and AP-Y, respectively. A member station STA-1 of the BSS-X is associated to the AP-X and they are thereby connected wirelessly. On the other hand, the AP-Y is connected to a wired Ethernet LAN whereon a second station STA-2 resides. Thus the AP-Y provides access to the station STA-2. In this case, the two stations STA-1 and STA-2 cannot communicate directly with each other, that is, the stations STA-1 and STA-2 are not covered by the same wireless AP. The AP-X acts as a station of the BSS-Y and communicates with the AP-Y via a wireless medium in accordance with the invention. Therefore, association must be established between the AP-X and the AP-Y. In FIG. 1, each addressable entity is assigned a hardware address called a MAC (media access control) address. Typically, the MAC address is six bytes long, with each byte of the address expressed as a pair of hexadecimal numbers. Note that a network device's MAC address is permanent, i.e., when a device is manufactured, a MAC address is burned into the device's ROM. Each of the stations STA-1 and STA-2 also has a network-layer address, namely the IP (Internet Protocol) address shown in dotted-decimal notation. For example, the STA-1 has the MAC address of 1A-23-F9-CD-06-9B and the IP address of 222.222.222.221 while the STA-2 has the MAC address of 5C-66-AB-90-75-B1 and the IP address of 222.222.222.223. It can be seen that the STA-1 and STA-2 are on the same local network segment due to their IP addresses.

Figure 2:
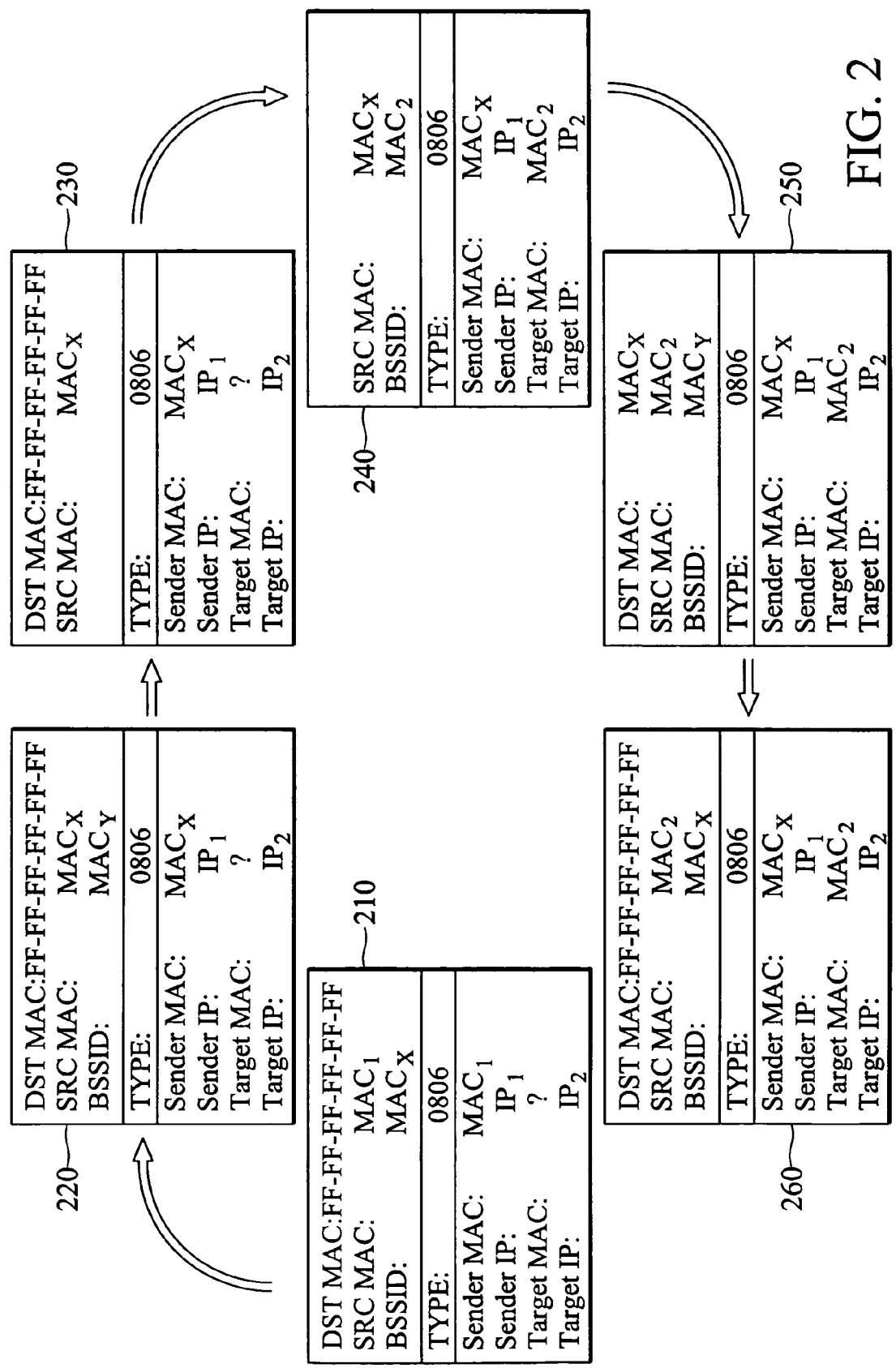
FIG. 2 is a diagram of an ARP packet in various stages of the traffic flow in accordance with an embodiment of the invention.
Figure 3:
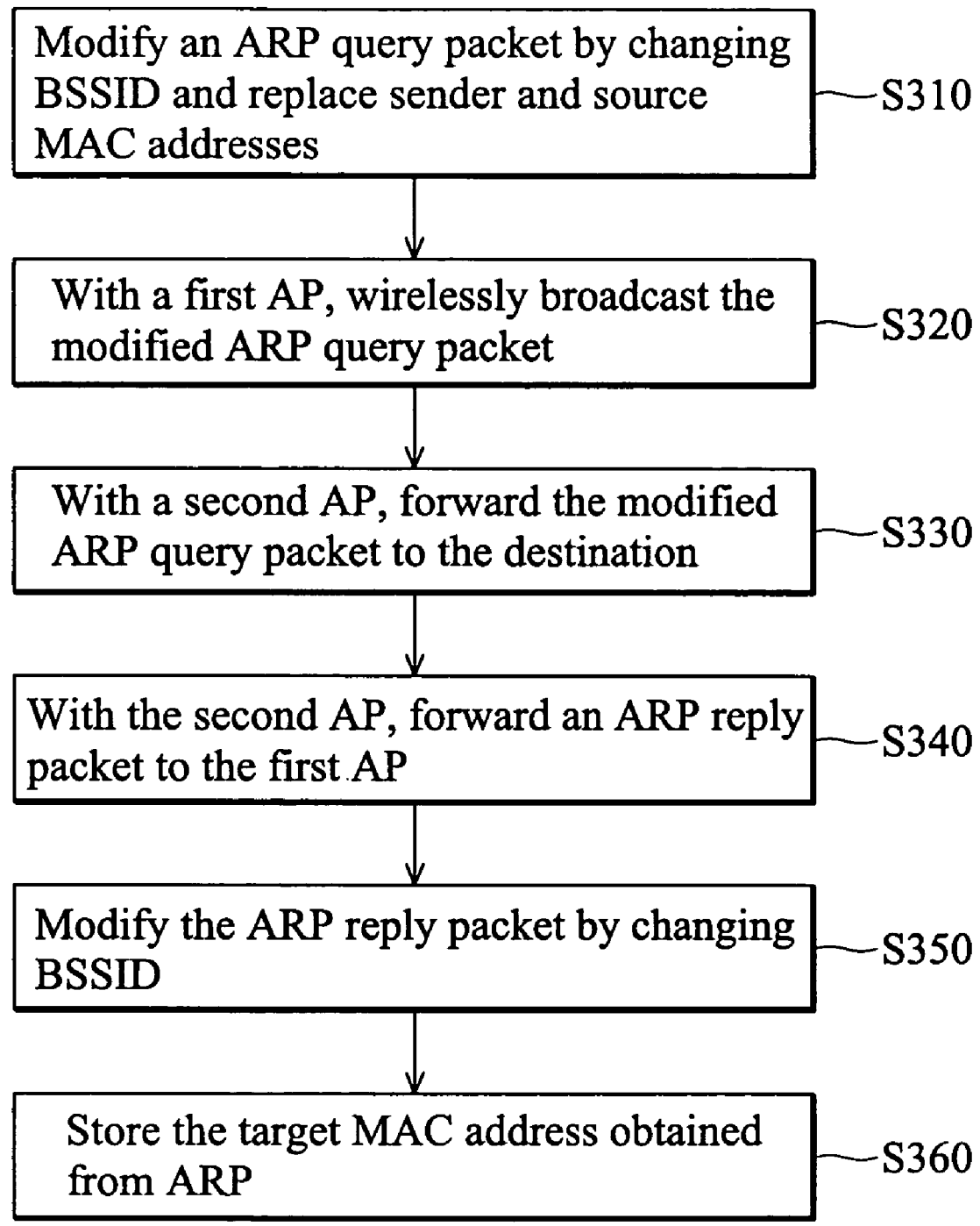
FIG. 3 is a flowchart illustrating primary steps used by an ARP procedure of FIG. 2 in accordance with the invention.

The invention will be described in detail by reference to FIGS. 2 through 7 when taken in conjunction with FIG. 1. To send an IP datagram to a node with IP address=222.222.222.223, the sending station STA-1 must provide not only the IP datagram but also the MAC address for that node. In general, network equipment is able to maintain a temporary table containing the mappings of IP addresses to MAC addressed. If the sending station's mapping table does not currently have an entry for the node 222.222.222.223, the sending station STA-1 must use the Address Resolution Protocol (ARP) to resolve the corresponding MAC address. The STA-1 constructs a special packet called an ARP packet with reference to FIG. 2. For brevity, the unique IP address is referred to as $IP_1$ for the station STA-1 and $IP_2$ for the station STA-2. In similar fashion, the MAC addresses of AP-X, AP-Y, STA-1 and STA-2 are referred to as $MAC_X$, $MAC_Y$, $MAC_1$ and $MAC_2$, respectively. The station STA-1 encapsulates the ARP packet in an 802.11 frame format, uses a special LAN broadcast address for the frame's destination MAC address, and transmits the frame wirelessly. For LANs that use six-byte addresses, the broadcast address is a string of 48 consecutive is (that is, FF-FF-FF-FF-FF-FF in hexadecimal notation). In FIG. 2, the ARP packet in each stage is depicted with two parts: the upper part for a MAC header and the lower part for an ARP datagram. Only those fields necessary for explanation of the invention are illustrated. The MAC header of the ARP packet includes address fields which carry a destination MAC address (DST MAC), a source MAC address (SRC MAC), and a set identifier namely Basic Service Set Identification (BSSID). In 802.11, the value of BSSID is the MAC address currently in use by the member station in the AP of the BSS. The ARP datagram also has four address fields: sender MAC, sender IP, target MAC, and target IP addresses. Furthermore, there is a two-byte field indicating the frame type. The frame type field can be any value greater than 05FF in hexadecimal notation but is typically 0800 or 0806 denoting Internet Protocol or Address Resolution Protocol, respectively.

The station STA-1 first broadcasts an ARP query packet 210 as shown in FIG. 2. Note that the MAC header of the ARP packet 210 now contains the BSSID (i.e. $MAC_X$) of the AP-X with which the STA-1 is associated. The AP-X of BSS-X detects that the broadcast packet is addressed to it, and therefore intends to pass the broadcast packet to the other access point through the air. Because the AP-X plays the client role from the perspective of the AP-Y, with reference to FIG. 3, the AP-X must modify the ARP query packet by changing the BSSID in the MAC header from $MAC_X$ (the MAC address of the AP-X) to $MAC_Y$ (the MAC address of the AP-Y) and further using $MAC_X$ in substation for the sender MAC address of the ARP datagram and the source MAC address in the MAC header (step S310). The modified ARP packet is illustrated in FIG. 2 and identified by reference numeral 220. Then the AP-X wirelessly broadcasts the modified ARP packet 220 (step S320). The AP-Y responds to the modified ARP packet 220 because the BSSID of the MAC header matches its MAC address. At the access point AP-Y, the modified ARP query packet is subjected to conversion from the IEEE 802.11 format to the IEEE 802.3 format. In FIG. 2, the ARP query packet of IEEE 802.3 format is identified by reference numeral 230. The AP-Y therefore forwards the ARP packet 230 and broadcasts it into the wired LAN (step S330). Each node on the wired LAN checks to see if its IP address matches the target IP address of the ARP query packet 230. In this case, the station STA-2, whose IP address matches $IP_2$ (i.e. 222.222.222.223), can respond to the ARP query packet 230 and send an ARP reply packet with the desired mapping back to the querying node. As shown in FIG. 2, the STA-2 fills in the target MAC address of the ARP reply packet 240 with its MAC address, namely 5C-66-AB-90-75-B1 ($MAC_2$). Thereafter, the AP-Y receives the ARP reply packet and converts it from the IEEE 802.3 format to the IEEE 802.11 format. The ARP reply packet of IEEE 802.11 format is illustrated in FIG.2 and identified by reference numeral 250. Note that the MAC header of the ARP reply packet 250 now contains the BSSID (i.e. $MAC_Y$) of the AP-Y. The ARP reply packet 250 is forwarded and destined to the AP-X that is a member station of the AP-Y (step S340). In response to receipt of the ARP reply packet issued from the STA-2, the AP-X is going to modify the ARP reply packet 250 in which the target MAC address has been set to $MAC_2$. The AP-X carries out the modification by changing the BSSID in the MAC header of the ARP reply packet from $MAC_Y$ to $MAC_X$ (step S350). Note that the AP-X sends the modified ARP reply packet to the broadcast address FF-FF-FF-FF-FF-FF. In FIG. 2, the modified ARP reply packet is identified by reference numeral 260. The querying station STA-1 can receive the modified ARP reply packet 260 and thereby obtain the MAC address corresponding to the IP address of 222.222.222.223 from the target MAC address in the ARP reply packet 260. Finally, the STA-1 stores the mapping of 222.222.222.223 to 5C-66-AB-90-75-B1 in its mapping table (step S360).

Figure 4:
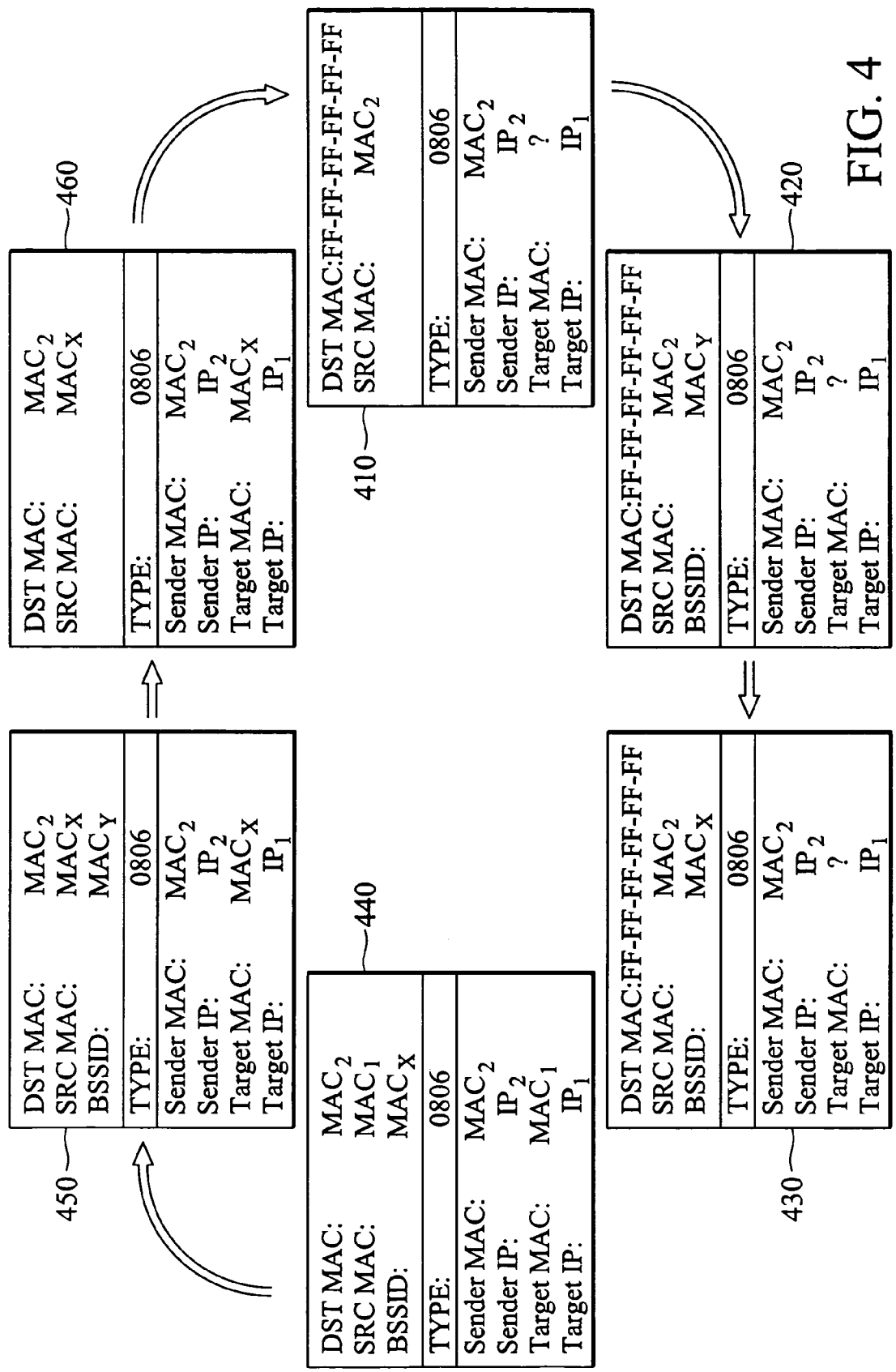
FIG. 4 is a diagram illustrating various stages of another ARP packet which is issued from an opposite end station in accordance with an embodiment of the invention.
Figure 5:
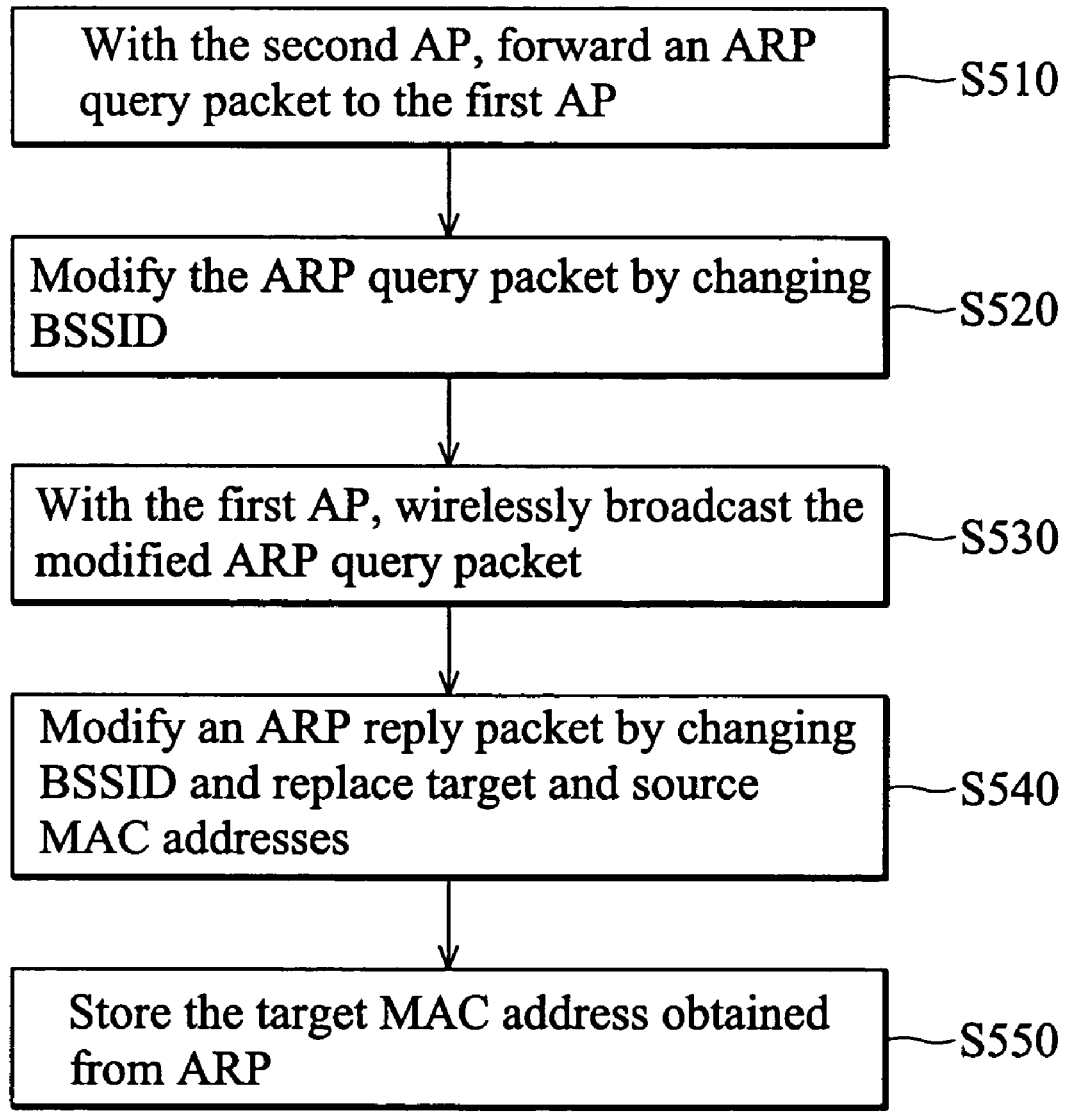
FIG. 5 is a flowchart illustrating primary steps used by an ARP procedure of FIG. 4 in accordance with the invention.

If the ARP process is originated from the STA-2, an ARP packet will travel in a direction opposite to the above description. For example, for STA-2 to send an IP datagram to a node with IP address=222.222.222.221, although the mapping table of STA-2 contains an entry for the node 222.222.222.221, the entry has expired over time. Therefore, the sending station STA-2 must use the ARP to resolve the corresponding MAC address. With reference to FIG. 4, the STA-2 first constructs an ARP query packet identified by reference numeral 410. The STA-2 broadcasts the ARP query packet 410 into the wired LAN. At the access point AP-Y, the ARP query packet 410 is subjected to conversion from the IEEE 802.3 format to the IEEE 802.11 format. In FIG. 4, the ARP query packet of IEEE 802.11 format is identified by reference numeral 420. With reference to FIG. 5, the AP-Y then forwards the ARP packet 420 wirelessly (step S510). Note that the MAC header of the ARP packet 420 now contains the BSSID (i.e. $MAC_Y$) of the AP-Y with which the AP-X is associated. As an associated station of the AP-Y, the AP-X is able to respond to the ARP query packet 420. The AP-X needs to modify the ARP query packet 420 by changing the BSSID in the MAC header from $MAC_Y$ to $MAC_X$ (step S520). The modified ARP packet is illustrated in FIG. 4 and identified by reference numeral 430. Subsequently, the AP-X wirelessly broadcasts the modified ARP query packet 430 (step S530). Each member of the BSS-X now determines if its IP address matches the target IP address of the ARP query packet 430. In the example of FIG. 1, the station STA-1, whose IP address matches $IP_1$ (i.e. 222.222.222.221), answers the modified ARP query packet and sends an ARP reply packet with the desired mapping back to the querying node. As shown in FIG. 4, the STA-1 fills in the target MAC address of the ARP reply packet 440 with its MAC address, namely 1A-23-F9-CD-06-9B ($MAC_1$). In response to receipt of the ARP reply packet, the AP-X intends to pass it to the AP-Y through the air. Accordingly, the ARP reply packet 440 is modified by substituting $MAC_X$ for the target and the source MAC addresses in the ARP reply packet 440 and also changing the BSSID in the MAC header of the ARP reply packet 440 from $MAC_X$ to $MAC_Y$ (step S540). In FIG. 4, the modified ARP reply packet is identified by reference numeral 450. Thereafter, the AP-Y receives the modified ARP reply packet and converts it from the IEEE 802.3 format to the IEEE 802.11 format. The ARP reply packet of IEEE 802.11 format is illustrated in FIG. 4 and identified by reference numeral 460. Finally, the querying station STA-2 receives the modified ARP reply packet 460, obtains a mapping of 222.222.222.221 to E6-E9-00-17-BB-4B ($MAC_X$) based on the target MAC address in the ARP reply packet 460, and thereby updates its mapping table (step S550).

Figure 6:
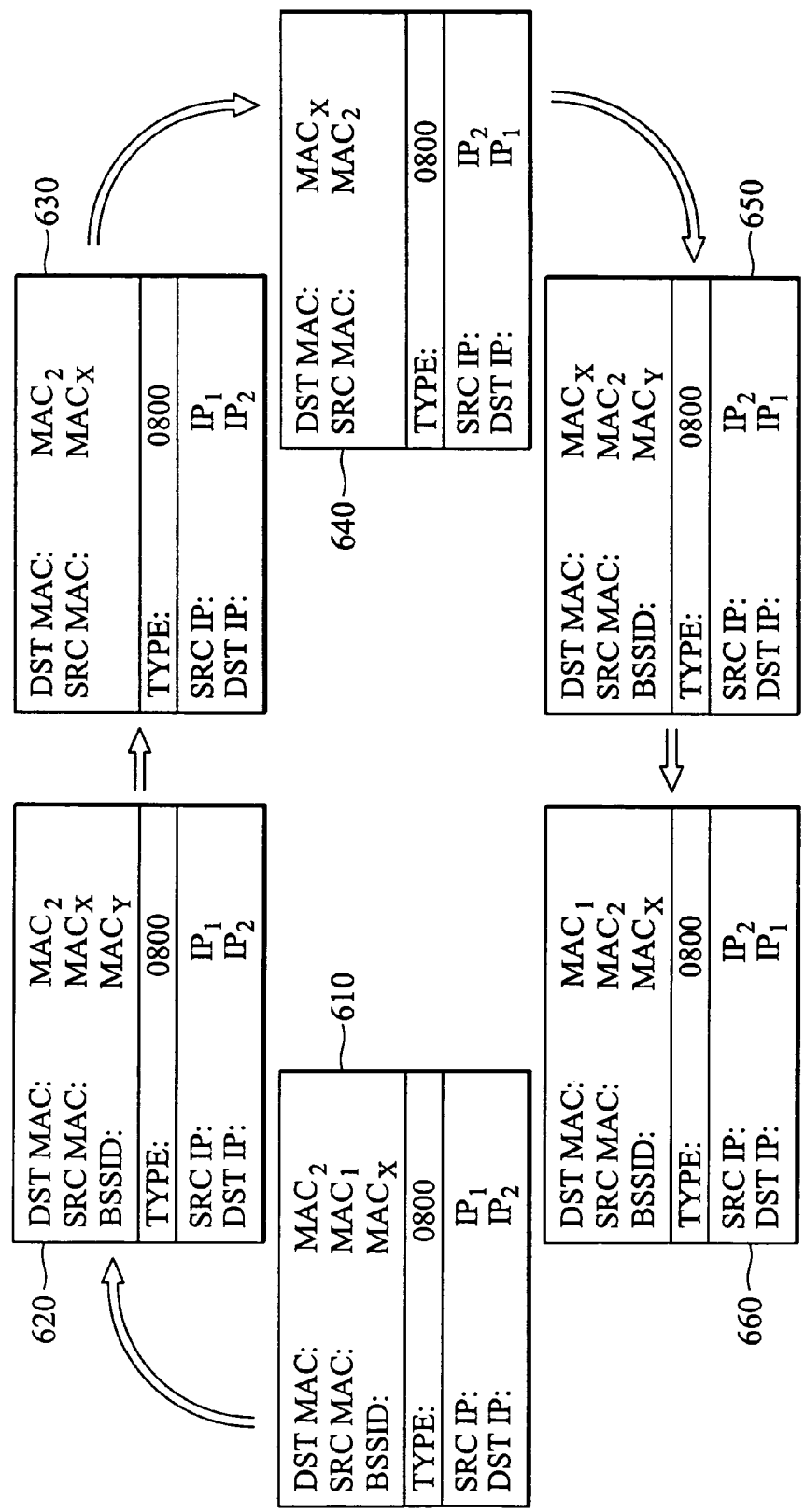
FIG. 6 is a diagram of an IP packet in various stages of the traffic flow in accordance with an embodiment of the invention.
Figure 7:
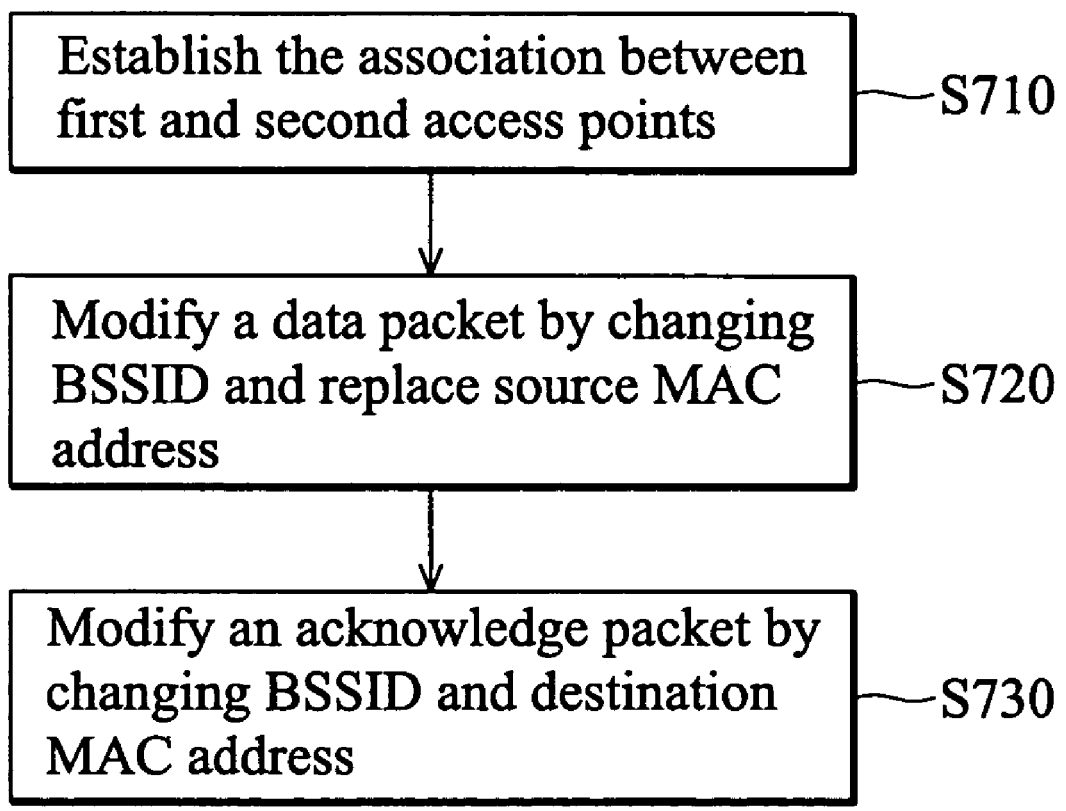
FIG. 7 is a flowchart illustrating primary steps of FIG. 6 in accordance with the invention.

The basic traffic flow between STA-1 and STA-2 is illustrated now by way of an example and with reference to FIGS. 6 and 7. The first step with reference to FIG. 7 is to establish the association between the AP-X and the AP-Y (step S710). For the STA-1 to send a datagram to a remote station, e.g. the STA-2, it first encapsulates a data packet using $IP_2$ and $MAC_2$ as the destination IP and MAC addresses, respectively. This data packet, identified by reference numeral 610 in FIG. 6, is transmitted to the AP-X wirelessly. From the BSSID in the MAC header of the data packet 610, the AP-X detects that the data packet 610 is addressed to it and intends to relay the data packet 610 to the AP-Y through the air. In accordance with the invention, the AP-X must modify the data packet by substituting $MAC_X$ for the source MAC address in the MAC header and changing the BSSID in the MAC header from the $MAC_X$ to $MAC_Y$ (step S720). The modified data packet is illustrated in FIG. 6 and identified by reference numeral 620. The AP-Y is able to respond to the modified data packet 620 because the BSSID of the MAC header matches its MAC address. At the AP-Y, the modified data packet is subjected to conversion from the IEEE 802.11 format to the IEEE 802.3 format. In FIG. 6, the data packet of IEEE 802.3 format is identified by reference numeral 630. The AP-Y then passes the data packet 630 to the wired LAN. The data packet 630 is destined to the STA-2 on the wired LAN. Thus the STA-2 receives the data packet and returns an acknowledgement packet. If necessary, the STA-2 applies ARP as described earlier to acquire the destination MAC address. In FIG. 6, the acknowledgement packet is identified by reference numeral 640 which uses IP, and $MAC_X$ as the destination IP and MAC addresses, respectively. Thereafter, the AP-Y receives the acknowledgement packet and converts it from the IEEE 802.3 format to the IEEE 802.11 format. The acknowledgement packet of IEEE 802.11 format including the BSSID (i.e. $MAC_Y$) of the AP-Y is illustrated in FIG. 6 and identified by reference numeral 650. Next, the acknowledgement packet 650 destined to the AP-X is transmitted wirelessly. Upon receipt of the acknowledgement packet issued from the STA-2, the AP-X modifies the acknowledgement packet 650 in which the destination IP address is set to $IP_1$. Note that the AP-X can look up the MAC address corresponding to the current destination IP address in its mapping table now and conclude that the corresponding MAC address is $MAC_1$. Hence, the AP-X carries out the modification by changing the BSSID in the MAC header of the acknowledgement packet from $MAC_Y$ to $MAC_X$ and changing the destination MAC address in the MAC header of the acknowledgement packet from $MAC_X$ to $MAC_1$ (step S730). In FIG. 6, the modified acknowledgement packet is identified by reference numeral 660. The acknowledgement packet 660 is transmitted through the air and the original sending station STA-1 is able to receive it from the AP-X.

In view of the above, the invention provides an apparatus and method that can relay messages from a station to another BSS via a wireless medium without the constraint of like manufactured access points.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for relaying messages via a wireless medium within a network environment, comprising the steps of:
   establishing association between first and second access points, where the first access point acts as a client from the perspective of the second access point;
   at the first access point, responsive to receipt of an Address Resolution Protocol (ARP) query packet transmitted wirelessly from a first station that is associated to the first access point, modifying the ARP query packet by substituting a hardware address of the first access point for a sender hardware address in an ARP datagram of the ARP query packet and a source hardware address in a MAC header of the ARP query packet and changing a set identifier in the MAC header of the ARP query packet from the hardware address of the first access point to that of the second access point; and
   at the first access point, responsive to receipt of an ARP reply packet issued from a second station whose network-layer address matches a target network-layer address in the ARP datagram of the modified ARP query packet, where a target hardware address in an ARP datagram of the ARP reply packet has been set to a hardware address of the second station, modifying the ARP reply packet by changing a set identifier in a MAC header of the ARP reply packet from the hardware address of the second access point to that of the first access point.

2. The method as recited in claim 1 wherein the second access point provides access to the second station which cannot communicate directly with the first access point.

3. The method as recited in claim 2 further comprising the steps of:
   wirelessly broadcasting the modified ARP query packet;
   forwarding the modified ARP query packet by the second access point if the set identifier in the MAC header of the modified ARP query packet matches the hardware address of the second access point; and
   at the second access point, receiving the ARP reply packet from the second station and forwarding the ARP reply packet to the first access point;

storing the hardware address of the second station which is taken from the target hardware address in the ARP datagram of the modified ARP reply packet, whereby the hardware address of the second station corresponding to the network-layer address of the second station is obtained at the first station.

4. The method as recited in claim 1 wherein the set identifier is a Basic Service Set Identification (BSSID) defined in the IEEE 802.11 standard.

5. The method as recited in claim 1 wherein the network-layer address is an Internet Protocol (IP) address.

6. The method as recited in claim 1 wherein the hardware address is a link-layer address.

7. The method as recited in claim 6 wherein the hardware address is a Media Access Control (MAC) address.

8. A method for relaying messages via a wireless medium within a network environment, comprising the steps of:
   establishing association between first and second access points, where the second access point provides access to a second station and the first access point acts as a client from the perspective of the second access point;
   forwarding an Address Resolution Protocol (ARP) query packet by the second access point, where the ARP query packet is issued from the second station and intended to resolve a network-layer address for a first station which cannot communicate directly with the second station and is associated to the first access point;
   at the first access point, responsive to receipt of the ARP query packet transmitted wirelessly, modifying the ARP query packet by changing a set identifier in a MAC header of the ARP query packet from a hardware address of the second access point to that of the first access point;
   wirelessly broadcasting the modified ARP query packet; and
   at the first access point, responsive to receipt of an ARP reply packet transmitted wirelessly from the first station whose network-layer address matches a target network-layer address in the ARP datagram of the modified ARP query packet, modifying the ARP reply packet by substituting the hardware address of the first access point for a target hardware address in an ARP datagram of the ARP reply packet and a source hardware address in a MAC header of the ARP reply packet and changing a set identifier in the MAC header of the ARP reply packet from the hardware address of the first access point to that of the second access point;
   wherein the second station thereby obtains a mapping of the hardware address of the first access point to the network-layer address of the first station.

9. The method as recited in claim 8 wherein the set identifier is a Basic Service Set Identification (BSSID) defined in the IEEE 802.11 standard.

10. The method as recited in claim 8 wherein the network-layer address is an Internet Protocol (IP) address.

11. The method as recited in claim 8 wherein the hardware address is a link-layer address.

12. The method as recited in claim 11 wherein the hardware address is a Media Access Control (MAC) address.

13. An apparatus for relaying messages via a wireless medium within a network environment having an access point that provides access to a destination station, comprising:
   means, responsive to receipt of an Address Resolution Protocol (ARP) query packet transmitted wirelessly from an associated station, for modifying the ARP query packet by substituting a built-in hardware address for a sender hardware address in an ARP datagram of the ARP query packet and a source hardware address in a MAC header of the ARP query packet and changing a set identifier in the MAC header of the ARP query packet from the built-in hardware address to a hardware address of the access point; and
   means, responsive to receipt of an ARP reply packet issued from the destination station whose network-layer address matches a target network-layer address in the ARP datagram of the modified ARP query packet, for modifying the ARP reply packet by changing a set identifier in a MAC header of the ARP reply packet from the hardware address of the access point to the built-in hardware address, where a target hardware address in an ARP datagram of the ARP reply packet has been set to a hardware address of the destination station.

14. The apparatus as recited in claim 13 further comprising means for establishing association with the access point, wherein the destination station cannot communicate directly with the associated station.

15. The apparatus as recited in claim 13 wherein the set identifier is a Basic Service Set Identification (BSSID) defined in the IEEE 802.11 standard.

16. The apparatus as recited in claim 13 wherein the network-layer address is an Internet Protocol (IP) address.

17. The apparatus as recited in claim 13 wherein the hardware address is a link-layer address.

18. The apparatus as recited in claim 17 wherein the hardware address is a Media Access Control (MAC) address.

19. A method for relaying messages via a wireless medium within a network environment, comprising the steps of:
   establishing association between first and second access points, where the second access point provides access to a second station and the first access point acts as a client from the perspective of the second access point;
   at the first access point, responsive to receipt of a data packet transmitted wirelessly from a first station which cannot communicate directly with the second station and is associated to the first access point, modifying the data packet by substituting a MAC address of the first access point for a source MAC address in a MAC header of the data packet and changing a set identifier in the MAC header of the data packet from the MAC address of the first access point to that of the second access point; and
   at the first access point, responsive to receipt of an acknowledgement packet issued from the second station whose IP address matches a destination IP address in an IP datagram of the modified data packet, modifying the acknowledgement packet by changing a set identifier in a MAC header of the acknowledgement packet from the MAC address of the second access point to that of the first access point and changing a destination MAC address in the MAC header of the acknowledgement packet from the MAC address of the first access point to that of the first station.

20. The method as recited in claim 19 wherein the set identifier is a Basic Service Set Identification (BSSID) defined in the IEEE 802.11 standard.

* * * * *